United States Patent

Farr

Patent Number: 5,383,719
Date of Patent: Jan. 24, 1995

[54] HYDRAULIC BRAKING SYSTEMS FOR VEHICLES

[75] Inventor: Glyn P. R. Farr, Warwickshire, England

[73] Assignee: Lucas Industries Public Limited Company, West Midlands, United Kingdom

[21] Appl. No.: 45,558

[22] Filed: Apr. 9, 1993

[30] Foreign Application Priority Data

Apr. 14, 1992 [GB] United Kingdom ............... 9208208

[51] Int. Cl.⁶ .................. B60T 13/18; B60T 13/68
[52] U.S. Cl. ................. 303/113.2; 303/116.2; 303/DIG. 4; 180/177
[58] Field of Search .............. 180/176, 177; 303/10, 303/11, 113.1, 113.2, 113.3, 113.5, 116.1, 116.2, DIG. 3, DIG. 4

[56] References Cited

U.S. PATENT DOCUMENTS

| | | | |
|---|---|---|---|
| 4,336,592 | 6/1982 | Beck | 303/DIG. 4 X |
| 4,708,225 | 11/1987 | Feldman et al. | 303/DIG. 4 X |
| 4,861,116 | 8/1989 | Bernhardt et al. | 303/DIG. 3 X |
| 5,205,623 | 4/1993 | Holzmann et al. | 303/113.2 |
| 5,230,400 | 7/1993 | Kakinami et al. | 180/177 X |

FOREIGN PATENT DOCUMENTS

| | | | |
|---|---|---|---|
| 0265623 | 5/1988 | European Pat. Off. | |
| 0442089 | 12/1990 | European Pat. Off. | |
| 3410083 | 10/1984 | Germany | |
| 4029793 | 3/1992 | Germany | |
| 169334 | 9/1985 | Japan | 180/177 |
| 1241252 | 10/1986 | Japan | 303/116.2 |
| 64857 | 3/1988 | Japan | 303/DIG. 3 |
| 143760 | 6/1991 | Japan | 303/DIG. 4 |
| 3164359 | 7/1991 | Japan | 303/DIG. 4 |
| 3243452 | 10/1991 | Japan | 303/DIG. 4 |
| 2100816 | 1/1983 | United Kingdom | |
| 2196709 | 5/1988 | United Kingdom | |
| 2218479 | 11/1989 | United Kingdom | 303/116.2 |
| 9217357 | 10/1992 | WIPO | |

Primary Examiner—Andres Kashnikow
Assistant Examiner—Alfred Muratori
Attorney, Agent, or Firm—Laff, Whitesel, Conte & Saret

[57] ABSTRACT

In an hydraulic braking system for vehicles solenoid-controlled valves are located in brake lines between the master cylinder and brakes on front and rear wheels of the vehicle. The solenoid-controlled valves are adapted to operate independently of each other to achieve independent pressure levels in the front and rear brakes by operation of a motor driven pump in response to signals supplied to an electronic control module from pressure sensing apparatus in each respective brake line.

7 Claims, 2 Drawing Sheets

HYDRAULIC BRAKING SYSTEMS FOR VEHICLES

BACKGROUND ART

This invention relates to hydraulic braking systems for vehicles of the kind in which brakes on wheels on front and rear axles of the vehicle are adapted to be applied by a pedal-operated master cylinder, and an electrically driven pump and solenoid-controlled valve means are incorporated for achieving brake application in a traction control mode or brake re-application in an anti-lock mode in response to energising currents from an electronic control module in turn responsive to signals from speed sensors for respective wheels.

In hydraulic braking systems of the kind set forth there is a requirement to monitor the braking ratio between the front and rear axles to cater for:

(a) a better utilisation of the available road surface friction;
(b) the effects of Powertrain retardation on the driven axle;
(c) the laden state of the vehicle;
(d) stability when braking in a bend; and
(e) "fade" at one of the axles.

DISCLOSURE OF INVENTION

According to our invention in an hydraulic braking system of the kind set forth for vehicles solenoid-controlled valves are located in brake lines between the master cylinder and brakes on front and rear wheels of the vehicle, and the solenoid-controlled valves are adapted to operate independently of each other to achieve independent pressure levels in the front and rear brakes by operation of the motor driven pump in response to signals supplied to the electronic control module from pressure sensing means in each respective brake line.

After the brake has been applied normally by the master cylinder, the solenoid-controlled valves close to isolate the brakes from the master cylinder and the respective pressures can then be increased by the pump to pressures determined by the pressure sensing means.

The achievement of independent pressure levels in front and rear brakes provides an ideal braking ratio and enables us to utilise fully available road surface friction. Isolating the master cylinder from the brakes provides substantially constant pedal effort in relation to vehicle deceleration and which is independent of vehicle load.

Providing independent pressure levels in front and rear brakes enables us to compensate for torque applied externally to a driven axle, for example in the case of regenerative braking with an electric vehicle.

During anti-lock (ABS) control the solenoid-controlled valves are also adapted to isolate the master cylinder from the brakes. This reduces vibration at the brake pedal and enables us to prolong pressure levels when just below the peak value. In such a mode of operation, during brake re-application, the pump pumps back against brake pressure and not against the pressure in the master cylinder. In consequence the pump can be relatively small in capacity to achieve sufficient pressure to re-apply the brakes.

The pressure sensing means are so constructed and arranged that without the addition of extra pedal effort from the driver, the pressure applied to the rear brakes can be increased automatically whenever the front wheel brakes are in an ABS mode. This enables us to utilise fully available road friction.

Since a solenoid-controlled valve isolates the master cylinder from a brake on a driven wheel, brake intervention is easily achievable to improve traction control.

When a vehicle is provided with an intelligent cruise control system, operation of the solenoid-controlled valves enables the brakes to be applied automatically, and independently of the master cylinder, in response to signals from such an intelligent cruise control system.

In one convenient construction a single common electrically driven pump is provided for front and rear brakes of a vehicle and each channel is provided with second and third solenoid-controlled valves in addition to the first solenoid-controlled valve adapted to isolate the master cylinder from the brake, and the pressure sensing means comprises a pressure transducer. Sequential operation of the three solenoid-controlled valves in each channel, together with operation of the pump, enables us to achieve anti-lock (ABS) control of the vehicle wheel, traction control of a driven wheel, independent pressure levels in the brakes of front and rear wheels, and further operation of the brake independently of the master cylinder for speed control, and for holding the vehicle on a hill.

BRIEF DESCRIPTION OF DRAWINGS

Two embodiments of our invention are illustrated in the accompanying drawings in which.

BEST MODE FOR CARRYING OUT THE INVENTION

Figure 1:
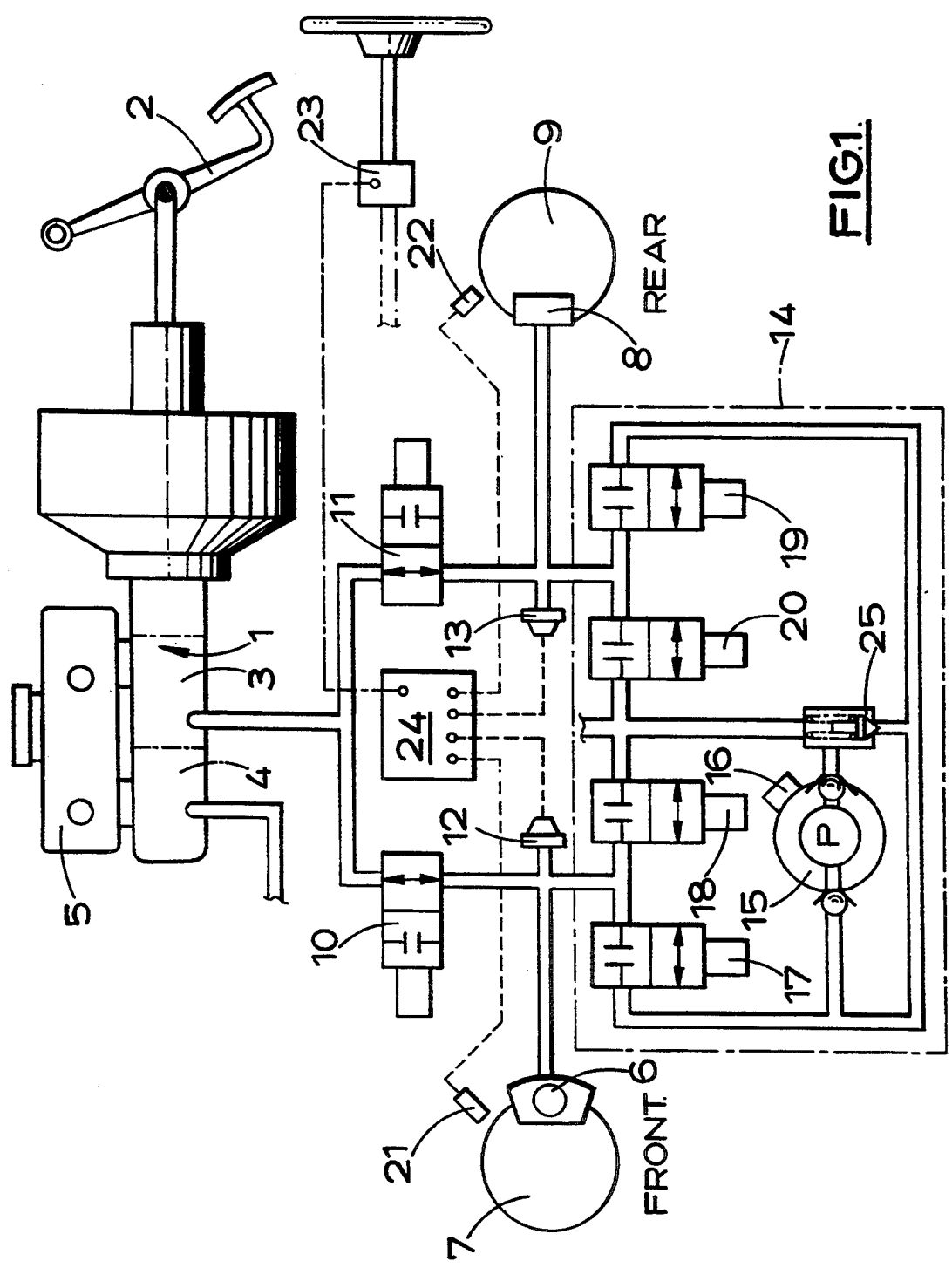
FIG. 1 is a layout of a brake management system for a vehicle.

The brake management system illustrated in FIG. 1 of the drawings comprises a booster-assisted master cylinder assembly 1 adapted to be operated by a pedal 2. The master cylinder comprises a primary pressure space 3 and a secondary pressure space 4 both supplied with fluid from a reservoir 5 mounted on the body of the master cylinder. The layout is of an 'X'—split system with the primary pressure space 3 supplying fluid to a brake 6 on a front wheel 7, and to a brake 8 on the diagonally opposite rear wheel 9, in a primary brake circuit. A similar, secondary, brake circuit, not shown, is embodied with the secondary pressure space 4. Only the primary brake circuit will be described for clarity.

First solenoid-controlled valves 10 and 11 are incorporated in a respective channel to each respective front normally open brake 6 and rear brake 8. The pressure in each channel is determined by a respective pressure transducer 12 and 13.

The system incorporates a brake pressure management system 14. This comprises a pump 15 adapted to be driven by an electric motor 16 for withdrawing fluid from a tank, for example the reservoir 5, and for pumping it in a circuit to the front brake 6 and the rear brake 8 under the control of pairs of normally closed second and third solenoid-controlled pressure application and pressure relief valves 17 and 18, for the front brake 16, and 19 and 20 for the rear brake 8.

Each wheel 7 and 9 is provided with a respective speed sensor 21 and 22, and the steering mechanism is provided with a load transducer 23.

An electronic control module 24 receives signals from the speed sensors 21 and 22, and from the load transducer 23. It differentiates such signals and then emits energising currents, the nature and magnitude of which being adapted to operate the electric motor 16 and the various solenoid-controlled valves 10, 11, 17, 18, 19, 20 in any predetermined sequence.

The maximum value of pressure which can be generated in the system by the pump is determined by a pressure relief valve 25. This is set to open at a given maximum pressure whereby fluid is relieved to the tank or reservoir 5.

In normal operation of the system the motor 16 and all the solenoid-controlled valves are de-energised. In this condition the first solenoid-controlled valves 10 and 11 are open but the four remaining valves 17, 18, 19, 20 are spring urged into closed positions. When the master cylinder 1 is operated fluid is transmitted to the brakes in an unrestricted manner through the open valves 10 and 11.

If the deceleration of the vehicle computed from signals from the wheel speed sensors 21 and 22 by the solenoid control module 24 is not compatible with pressure applied to the front brakes the first solenoid-controlled valve 11 incorporated in the channel to the wheel brake 8 is closed. At the same time the motor driven pump 15 is started and the second solenoid-controlled valve 19 is opened, or pulsed, to enable the pressure applied to the rear brake 8 to be increased by the pump up to a predetermined limit, for example 50% or more. As a result, the rate of vehicle deceleration will increase to an expected level.

Increasing the rear pressure level will be necessary whenever the vehicle is fully laden, or whenever the front brakes are fading due to over heating. Similarly, if the vehicle's deceleration exceeds the expected level because the front wheel drive Powertrain is providing extra retardation, for example in the case of an electric vehicle or an engine in a low gear, the solenoid-controlled valve 10 in the front brake channel will close to permit an increase in rear pressure, direct from the master cylinder.

If the vehicle is braking with an intensified pressure having being applied to the rear wheel brakes and the steering wheel is turned to negotiate a corner, the normally closed third solenoid-controlled relief valve 20 between the rear brake 8 and the tank 5 will be pulsed to reduce the pressure to a level normally equal to that of the front brakes 6.

If a skid signal is received from the front wheel speed sensor 21, the first solenoid-controlled valve 10 is closed and the third normally-closed solenoid-controlled relief valve 18 between the front wheel brake 6 and the tank 5 is opened or pulsed to relieve brake pressure. At the same time the motor driven pump 15 is energised. On wheel recovery, the second solenoid-controlled application valve 18 closes and the third solenoid-controlled valve 17 between the pump 15 and the brake 6 opens or pulses to enable the pump 15 to re-apply the brake pressure. During this mode, since the solenoid-controlled valve 10 is closed, the pump 15 only needs to overcome brake pressure and not master cylinder pressure. When the brake pressure measured by the pressure transducer 12 is just below the level which caused the skid signal, the second solenoid-controlled valve 17 is pulsed to increase gradually the pressure applied to the brake 6.

Should the speed sensor 22 also indicate a potential skid condition but at a higher pressure, the first solenoid-controlled valve 11 in the rear brake channel is closed and the third normally-closed solenoid-controlled relief valve 20 opens to relieve the pressure to tank. Upon wheel recovery, the pressure can be re-applied to a higher level than that applied to the front wheel brakes whenever the second solenoid-controlled application valve 17 is closed or is being pulsed, but not when it is open.

This feature is unusual in that a single pump 15 can apply different pressure levels to brakes in different channels of the same hydraulic circuit. In pump back to brake systems it is usual to have to provide one pump per brake. The present system enables us to cater for lower pressures in the rear wheel brakes when compared with the fronts, a condition experienced when the diagonal wheels 7, 9 are on surfaces of different co-efficients of friction.

During ABS activity at the front or rear wheels the first solenoid-controlled valves 10 and 11 isolate the master cylinder 1 from the cyclic pressure pulses at the brakes and no adverse reaction is felt at the brake pedal 2.

If the braked vehicle passes from a surface having a low co-efficient of friction to a surface having a high co-efficient of friction, the pressure applied to the front brake 6 is re-applied to the level which caused the skid and thereafter the first solenoid-controlled valve 10 is pulsed to increase pressure from the master cylinder assembly 1 itself. This ensures that the fluid originally applied to the front brake 6 by the master cylinder assembly 1 is fully recovered. For the rear brake, the pressure may already be in excess of that supplied by the master cylinder assembly 1. Because of weight transfer the need to increase pressure applied to the rear brakes is small. As a result, the solenoid-controlled valve 11 remains closed and its second solenoid-controlled valve 19 is pulsed to apply further pressure to the rear brake 8 from the pump 15.

In ABS mode, the pump 15 delivers fluid continually so that whenever the second solenoid-controlled application valves 17 and 19 leading to the brakes 6 and 8 are closed, excess fluid passes through the relief valve 25 to the tank. The relief valve 25 is set at a level just exceeding the maximum brake pressure required for a 1.2 g deceleration, namely the limit determined by the tire/road adhesion.

The system can also provide brake intervention for traction control and a hill hold feature. If the vehicle is front wheel drive and a drive wheel starts to spin, the solenoid-control valve 10 is closed, the second solenoid-controlled valve 17 opens, and the motor driven pump 15 is energised to draw fluid from the reservoir and force it into the brake 6. Upon recovery of the wheel 7, the solenoid-controlled relief valve 18 opens to relieve the brake 6. Subsequently the solenoid-controlled valves 17 and 18 are operated to control the brake torque of the driven wheel 7. At a predetermined speed, for example 30 kph, the solenoid-controlled valves 10 opens to release the brake 6 and to reconnect the master cylinder 1 to the brake 6. If the brake pedal is actuated during the traction control mode, the solenoid-controlled valve 10 automatically opens and the second and third solenoid-controlled valves 17 and 18 close.

When the vehicle comes to rest on an upwardly facing hill with the brakes applied, the solenoid-controlled valve 11 closes and the pump 15 starts to apply sufficient pressure to the rear wheel brakes to hold the vehicle on a 1 in 3 hill. Since the brake slack has already been taken up, this happens very quickly. The driver may now move his foot from the brake pedal 2 to the accelerator in readiness to move away. When the forward driving force exceeds the braking force required to hold the vehicle on the hill, the rear wheel brakes 8 are released by opening the first solenoid-controlled valve 11. Alternatively, the vehicle can be held on the hill by all four brakes which are relieved whenever the tractive force exceeds the braking force required to prevent reverse motion.

When the vehicle is fitted with an intelligent cruise control system and the brakes need to be applied automatically in order to regulate the speed of the vehicle and the distance between the vehicle and a lead vehicle immediately in front of it, the two first solenoid-control valves 10 and 11 are closed and the motor 16 for driving the pump 15 is energised. At the same time the solenoid application valve 17 for the front brake 6, and a similar solenoid valve for the brake on the other front wheel are open. The two front wheel brakes are therefore applied simultaneously. To equate the two pressures, one of the two solenoid-controlled valves 17 can be pulsed to ensure an equal pressure rise rate which is measured by the pressure transducer 12 and the pressure transducer for the other front wheel.

Figure 2:
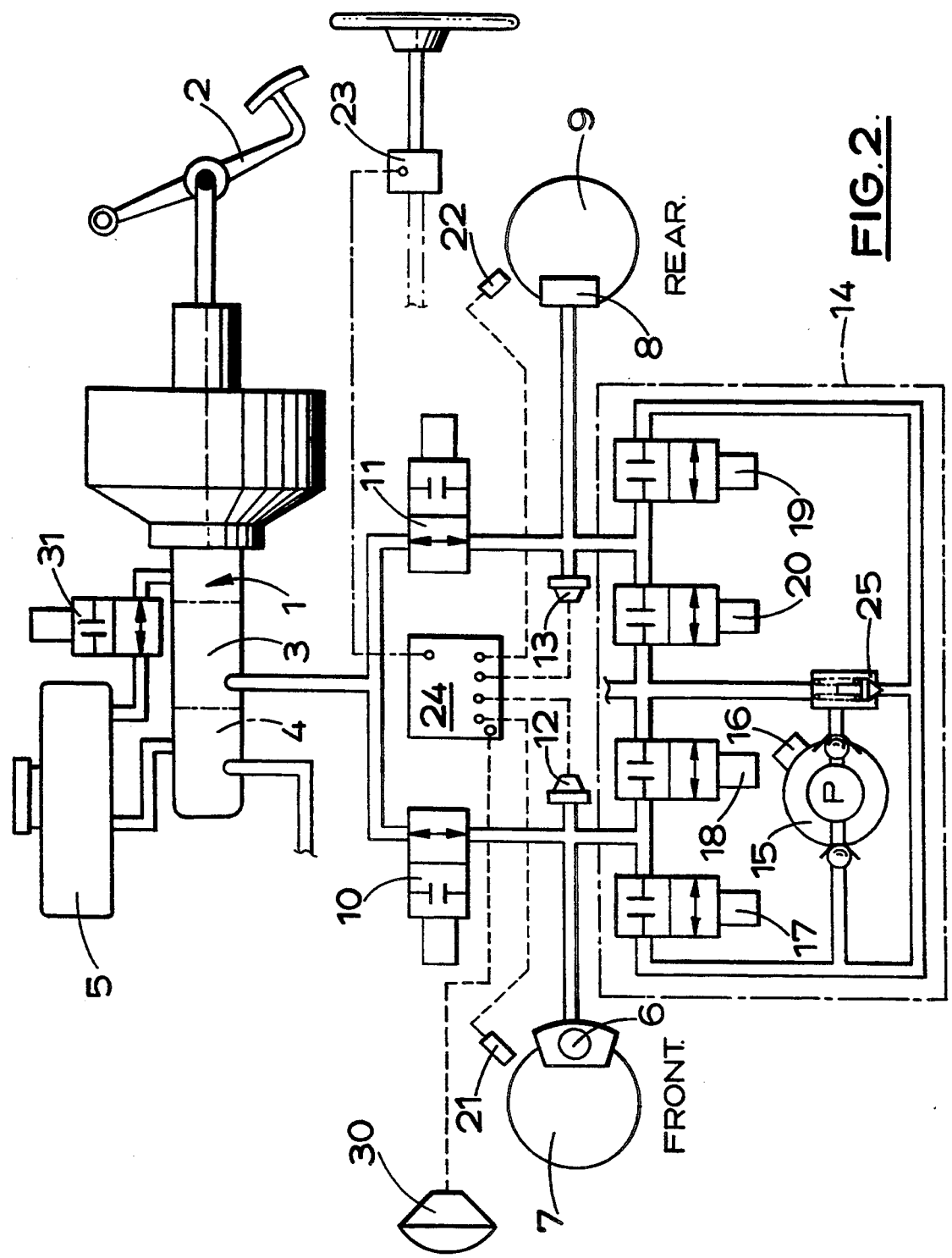
FIG. 2 is a layout of a system similar to FIG. 1 but for use with a vehicle fitted with an intelligent cruise control system.

The system illustrated in the layout of FIG. 2 includes an intelligent cruise control system. Specifically this comprises a radar device 30 which supplies signals to the electronic control module 24. In addition the primary pressure space 3 of master cylinder 1 and its corresponding primary brake circuit is adapted to be isolated from the reservoir 5 through a solenoid-controlled isolator valve 31 which is normally open.

When the pump 15 is started, only one of the valves 17 or 19 connected to the primary brake circuit needs to be open and the isolator valve 31 closed. As the pump pressure builds up in the circuit, the secondary or floating piston of the tandem master cylinder assembly 1 is displaced to apply the brakes in the other or secondary brake circuit. Thus all brakes are subjected to substantially the same pressures. The brakes on the rear wheels can be isolated if required by opening the solenoid-controlled valve 10, and the corresponding valve in the secondary brake circuit, and closing the solenoid-controlled valve 11, and corresponding valve in the secondary brake circuit. When sufficient pressure has been applied the second solenoid-controlled valve 17 or 19 closes and the pump 15 stops. To relieve the brakes either the solenoid-controlled valve 18 between the primary pressure space 3 and the tank is opened, or the isolator valve 31 between the primary pressure space 3 and the reservoir is opened.

This method of applying pressure can also be used for brake intervention of the driven wheels during traction control or for holding on a hill.

The construction and operation of the system illustrated in FIG. 2 of the drawings is otherwise the same as that of FIG. 1 and corresponding reference numerals have been applied to corresponding parts.

I claim:

1. An hydraulic braking system for a vehicle having brakes on wheels on front and rear axles, comprising a pedal-operated master cylinder for applying said brakes, an electrically driven pump, speed sensors for sensing the behaviour of respective wheels, an electronic control module for emitting electric currents in response to signals from said speed sensors, and solenoid-controlled valve means for achieving brake application in a traction control mode and brake re-application in an anti-lock mode in response to energising currents from said electronic control module in turn responsive to signals from said speed sensors, wherein separate first solenoid-controlled valves are located in brake lines between said master cylinder and each of said brakes on said front and rear wheels of the vehicle, pressure sensing means are disposed in each respective said brake line and said solenoid-controlled valves are adapted to operate independently of each other to achieve independent pressure levels in the front and rear brakes by operation of said pump in response to signals supplied to said electronic control module from said pressure sensing means in each respective brake line.

2. A system according to claim 1, wherein said pressure sensing means are so constructed and arranged that the pressure applied to said rear brakes can be increased automatically whenever said front wheel brakes are in an ABS mode and without the addition of an extra effort to the pedal of said master cylinder.

3. A system according to claim 1, wherein during ABS control said first solenoid-controlled valves are also adapted to isolate said master cylinder from said brakes whereafter during brake re-application, said pump pumps back against brake pressure and not against pressure in said master cylinder.

4. A system according to claim 1, including an intelligent cruise control system, wherein operation of said first solenoid-controlled valves enables said brakes to be applied automatically and independently of operation of said master cylinder in response to signals from said intelligent cruise control system.

5. A system according to claim 4, wherein said master cylinder has a reservoir and primary and secondary spaces fed from said reservoir, said brakes being disposed and arranged in primary and secondary circuits and wherein a solenoid-controlled isolator valve is adapted to control communication between said reservoir and said primary space whereby, upon closure of the isolator valve, pressure from the pump builds up in said primary circuit to pressurise said primary space and displace a piston said master cylinder to pressurise said secondary space to apply said brakes in said secondary circuit, all said brakes being subjected to substantially the same pressures independent of operation of said pedal.

6. A system according to claim 1, wherein a single common electrically driven pump is provided for said front and rear brakes of the vehicle and each said brake line is provided with second and third solenoid-controlled valves in addition to said first solenoid-controlled valve.

7. A system according to claim 1, wherein said pressure sensing means comprises pressure transducers.

* * * * *